US008407344B2

(12) United States Patent
Zabawskyj et al.

(10) Patent No.: US 8,407,344 B2
(45) Date of Patent: Mar. 26, 2013

(54) METHOD AND SYSTEM FOR ACTIVE PROFILE SERVER

(75) Inventors: Bohdan Konstantyn Zabawskyj, Woodbridge (CA); Karthik Ramakrishnan, Dubai (AE); Rushabhdev Gudka, Scarborough (CA); Kar Wai Wong, Toronto (CA); Philip Renwell Steele, Hillsburgh (CA)

(73) Assignee: Redknee Inc., Mississauga (CA)

( * ) Notice: Subject to any disclaimer, the term of this patent is extended or adjusted under 35 U.S.C. 154(b) by 542 days.

(21) Appl. No.: 11/516,308

(22) Filed: Sep. 6, 2006

(65) Prior Publication Data

US 2008/0059653 A1    Mar. 6, 2008

(51) Int. Cl.
*G06F 15/173* (2006.01)
(52) U.S. Cl. ............ 709/225; 455/410; 455/432.3; 455/414.1; 455/456.1; 379/201.02
(58) Field of Classification Search ............ 455/456.1, 455/456.2, 414.1, 433, 432.1, 410; 370/329, 370/259; 379/207.15, 201.02, 221.09, 88.01; 709/225; 707/999.003; 715/716
See application file for complete search history.

(56) References Cited

U.S. PATENT DOCUMENTS

| | | | | | |
|---|---|---|---|---|---|
| 5,650,994 | A | * | 7/1997 | Daley ........................... | 370/259 |
| 6,031,904 | A | * | 2/2000 | An et al. ...................... | 379/201.02 |
| 6,067,347 | A | * | 5/2000 | Farris et al. ................. | 379/88.01 |
| 6,133,912 | A | * | 10/2000 | Montero ....................... | 715/716 |
| 6,584,312 | B1 | * | 6/2003 | Morin et al. .................. | 455/433 |
| 6,603,969 | B1 | * | 8/2003 | Vuoristo et al. ............. | 455/433 |
| 6,622,016 | B1 | * | 9/2003 | Sladek et al. ............... | 455/414.1 |
| 6,628,954 | B1 | | 9/2003 | McGowan et al. | |
| 6,731,932 | B1 | * | 5/2004 | Rune et al. .................. | 455/432.1 |
| 6,781,972 | B1 | * | 8/2004 | Anderlind et al. ........... | 370/329 |
| 6,804,716 | B1 | * | 10/2004 | Koch et al. .................. | 709/225 |
| 7,110,749 | B2 | * | 9/2006 | Zellner et al. ............... | 455/414.1 |
| 7,116,985 | B2 | * | 10/2006 | Wilson et al. ............... | 455/456.1 |
| 7,181,441 | B2 | * | 2/2007 | Mandato et al. ........... | 707/999.003 |
| 7,203,752 | B2 | * | 4/2007 | Rice et al. ................... | 709/225 |
| 7,215,754 | B1 | * | 5/2007 | Woodson et al. .......... | 379/221.09 |
| 7,493,125 | B2 | * | 2/2009 | Nagesh et al. .............. | 455/456.1 |
| 2002/0115453 | A1 | * | 8/2002 | Poulin et al. ................ | 455/456 |
| 2003/0063730 | A1 | * | 4/2003 | Woodring .................... | 379/207.15 |
| 2003/0081607 | A1 | | 5/2003 | Kavanagh | |
| 2003/0115203 | A1 | | 6/2003 | Brown et al. | |
| 2004/0068502 | A1 | | 4/2004 | Vogedes et al. | |

(Continued)

FOREIGN PATENT DOCUMENTS

WO    WO 00/31630    6/2000
WO    03/067830 A1    8/2003

OTHER PUBLICATIONS

International Search Report PCT/CA2007/001570 dated Sep. 6, 2007 (4 pages).

(Continued)

*Primary Examiner* — Dustin Nguyen
(74) *Attorney, Agent, or Firm* — Gardner, Linn, Burkhart & Flory, LLP

(57) ABSTRACT

A system and method for active profile services is provided. An embodiment includes an active profile server that is configured to respond to requests for subscriber profile information from an application server. The profile server is further configured to access a known set of profile information for a subscriber and, according to predefined criteria, automatically modify the known set of subscriber profile information and provide the modified profile information to the application server.

18 Claims, 9 Drawing Sheets

U.S. PATENT DOCUMENTS

2004/0102182 A1* 5/2004 Reith et al. .................... 455/410
2005/0030920 A1 2/2005 Garcia Cadarso et al.
2008/0119203 A1* 5/2008 Shalmon et al. ........... 455/456.2

OTHER PUBLICATIONS

Nokia: "Deletion of PDP contexts with exhausted account", 3GPP Draft; S5-024331, 3rd Generation Partnership Project (3GPP), Mobile Competence Centre; 650, Route Des Lucioles; F-06921 Sophia-Antipolis Cedex; France, vol. SA WG5, no. Atlanta/Georgia, USA; 20021009, Oct. 9, 2002, XP050295346.

"Digital cellular telecommunications system (Phase 2+); Universal Mobile Telecommunications System (UMTS); General Packet Radio Service (GPRS); GPRS Tunnelling Protocol (GTP) across the Gn and Gp interface (3GPP TS 29.060 version 5.2.0 Release 5); ETSI TS 129 060" ETSI Standards, LIS, Sophia Antipolis, Cedex, France, vol. 3-CN2; 3-CN4, No. V5.2.0, Jun. 1, 2002, XP014017195.

European Patent Application No. EP 05 78 4366 Supplementary Search Report dated Mar. 26, 2010.

Extended European Search Report for European Patent Application No. 07800591 with a mailing date of Oct. 7, 2010.

* cited by examiner

METHOD AND SYSTEM FOR ACTIVE PROFILE SERVER

FIELD OF THE INVENTION

The present invention relates generally to telecommunication networks and services, and more particularly relates to a method and system for active profile services.

BACKGROUND OF THE INVENTION

As the basic infrastructure of telecommunication networks matures, so too does the demand for rich and personalized subscriber applications. Telecommunication services began with simply offering low-bandwidth voice connectivity over a wired connection, and have now evolved into offering a broad range of high-bandwidth interactive audio-visual applications over both wired and wireless connections. Examples of such applications include text messaging delivering simple character-based messages and multi-media messaging delivering rich audio and video messages. These applications are also highly interactive, as subscribers are able to browse and search the internet, view maps, query locations of other subscribers and the like. As wireless telecommunications infrastructure improves, these applications are increasingly available on mobile devices such as cellular telephones, wireless paging devices, wireless personal digital assistants and devices that combine these functionalities. In the wireless context, commercialization of these applications is sometimes referred to as m-commerce, short for "mobile-commerce".

M-commerce has typically been characterized as the natural next step or a complementary alternative to a traditional electronic commerce ("e-commerce") environment. However, clear traction for successful m-commerce environments remains elusive in that m-commerce activities have been subject to a variety of constraints such as a lack of seamless personalization capabilities. No clear 'killer mobile app' has been identified and subscriber's responsiveness to broad segmentation schemes that focus on bundles of 'air time', services, and content has been lukewarm at best. This suggests that there is a latent demand for a form of 'mass customization' with respect to the delivery of highly tailored services and content that can be only provided by a personalized m-commerce environment.

Personalization can be defined as the process of delivering a wide range of content and services customized and controlled to satisfy specific customer needs. Whereas product differentiation tries to differentiate a product from competing ones, personalization tries to make a unique product offering for each customer. Personalization is about managing customers rather than products, differentiating customers not products, and measuring share of customer not share of market.

An m-commerce environment should be designed with a user-centric and regional focus that accommodates for user mobility and anytime anywhere service accessibility. The seamless and proactive provision of contextually relevant m-commerce services will require a mechanism for the seamless derivation and provision a given subscriber's preferences (e.g. language, preferred services) and contextually relevant data (e.g. terminal in use, location, current state etc.). To date, this information has typically been stored in isolated islands of information and has not generally been available for use by third party providers of content, applications and services. In turn, wireless subscribers are required to maintain an increasingly untenable list of passwords as well as redundant sets of confidential data. At least from the perspective of an m-commerce environment, there is an opportunity to provide services of greater intrinsic value by tailoring services via real-time personalization technologies.

Given the potential sensitivity of subscriber data, it is critical to at least some subscribers that concerns with respect to security and privacy be addressed. This concern is heightened in an m-commerce environment with 87% expressing a lack of comfort with m-commerce transactions (Forrester). Therefore, any personalization technology should empower users to control when, where and who sees their subscriber data.

As technologies mature, consumer's expectations never cease to rise. This move to personalized applications is set to drive the next wave of Internet service innovation. For example, today's personalized news alert services enable the configuration of content, alert method and preferred identity. But this can be expanded to inform news relevant to circumstances such as location, or even more powerfully, customized according to the subscriber's pre-defined combination of decisions such as 'if the subscriber's location is home and it is a weekend and the news is about the subscriber's company or a customer then alert the subscriber otherwise store till it is a work day'.

Today's personalized service experiences are limited through the subscriber's pre-defined static decisions and their configuration of specific preferences for each and every service. In addition, the experiences are rarely relevant to the customer's particular circumstances. News alerts arrives whether the subscriber is at lunch, in a meeting or whether it's the weekend. In the prior art, advertisements presented alongside Internet content, although relevant to the content the subscriber is presently browsing, does not typically take into account the client's age, the car driven by the client, or the fact that the client is in a hotel, the time and the client is likely going to relocate to a downtown location on a transient basis.

Additionally, customers increasingly expect to be able to access their same service or application irrespective of the access method. Fixed-mobile convergence is happening as a result of service level integration than rather than network level; subscribers care less about the network layer than the service they purchase. But due to the different capabilities of the network access, converged services offerings need to rely even more on the context of the customer when delivering the experience.

Consideration of how different identities are used by subscribers must also be made; email, mobile number, instant messenger identity are a few examples. Thus, as the above drives the need for improvements to profile management in the mobile environment, such improvements will also need to be incorporated into fixed (i.e. non-mobile) environments.

SUMMARY OF THE INVENTION

An aspect of the invention provides an active profile server comprising a processing unit and an interface connecting the processing unit to a profile database. The profile database stores profile information respective to at least one subscriber. The server also comprises an interface connecting the processing unit to an application requesting access to the profile information. The processing unit is configured to retrieve the profile information from the profile database and to present a modified version of the profile information to the application in place of the profile information.

A system and method for active profile services is provided. An embodiment includes an active profile server that is configured to respond to requests for subscriber profile information from an application server. The profile server is further configured to access a known set of profile information for a subscriber and, according to predefined criteria, automatically modify at least a portion of the known set of subscriber profile information and provide the at least a portion of modified profile information to the application server.

The modified version can be empty, and in effect be a refusal to provide the subscriber profile information. In this case the modified version can include a message that the request to access the profile information is refused.

The profile database can be stored locally on the profile server. However, the profile database can also be stored at a location remote from the profile server.

The profile database can include one or more of the following fields of information for each subscriber: subscriber name; ID of Active Device; Type of Active Device; Location; Default Language; Modification Criteria Exists?; Location of Modification Criteria Database; Subscribed Applications and Rates; Account Type; Account Location; Age; Gender; Address; Group Membership Information; and Service Provider.

The profile information can includes presence information.

The application can be configured to modify or append to the profile information.

The modified version can be generated using modification criteria. The modification criteria can be included in the profile information. The modification criteria can implement privacy legislation.

Another aspect of the invention provides a method for providing active profile services comprising:

receiving a request to access profile information of a subscriber; retrieving the profile information;

modifying the profile information according to modification criteria; and presenting the modified profile information in response to the request.

The method can further comprising responding to the request by presenting the profile information in unmodified form if so permitted by the modification criteria. The modified profile information may contain no data, in which case the modified version can be accompanied by a message that the request to access the profile information is refused.

The profile information can includes one or more of the following fields of information for each subscriber: subscriber name; ID of Active Device; Type of Active Device; Location; Default Language; Modification Criteria Exists?; Location of Modification Criteria Database; Subscribed Applications and Rates; Account Type; Account Location; Age; Gender; Address; Group Membership Information; and Service Provider. The profile information can includes presence information.

The method can further comprise appending additional information to the profile information.

The modification criteria can be included in the profile information.

The modification criteria can implement privacy legislation.

Another aspect of the invention provides a computer readable medium comprising a plurality of programming instructions for execution on a server; the programming instructions implementing a method comprising:

receiving a request to access profile information of a subscriber;

retrieving the profile information;

modifying the profile information according to modification criteria;

presenting the modified profile information in response to the request.

DETAILED DESCRIPTION OF THE EMBODIMENTS

Figure 1:
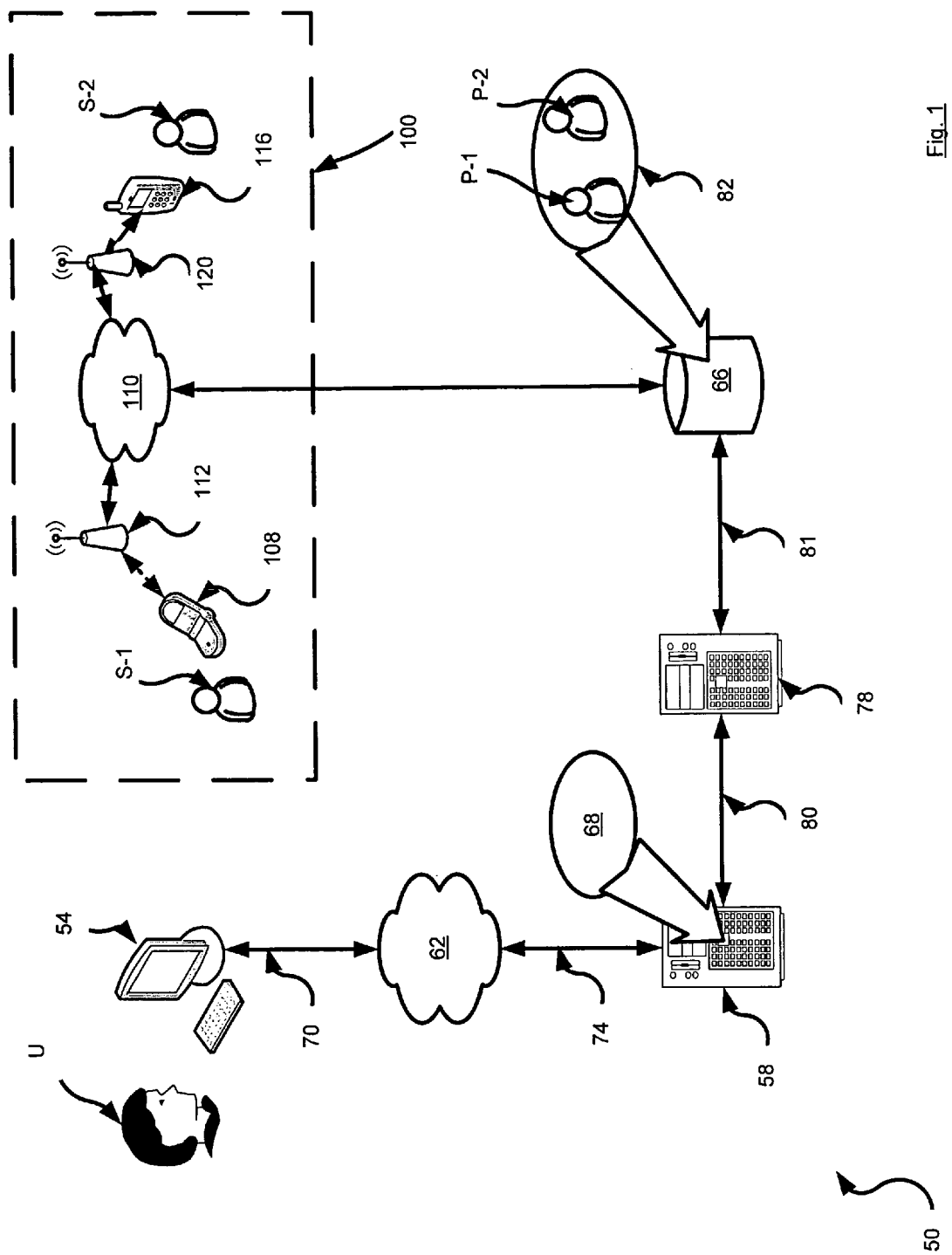
FIG. 1 shows a schematic representation of a system for profile services in accordance with an embodiment of the invention.

Referring now to FIG. 1, a system for profile services is indicated generally at 50. System 50 comprises a client machine 54 that is being operated by a user U. Client machine 54, in turn, is connected to an application server 58 via a network 62. In turn, application server 58 is connected to a profile database 66.

Client machine 54 is any type of computing device that can receive input from user U and present output to user U, and also communicate over network 62. Thus client machine 54 can be, for example, a desktop computer, a laptop computer, a wireless personal digital assistant, a cellular telephone, a wireless email pager. Client machine 54 connects with network 62 via a link 70. Link 70 can be wired or wireless or combinations thereof. Link 70 is complementary to the network interface in client machine 54.

As one example, where client machine 54 is a desktop or laptop computer, and link 70 is wired, then link 70 can be an Ethernet link, a digital subscriber line ("DSL") link, a cable-Internet link, a fibre-optic link and/or combinations thereof.

As another example, where client machine 54 is a cellular telephone or wireless email pager, and link 70 is wireless, then link 70 can be, for example, based on the global system for mobile communications ("GSM"), or Code Division Multiple Access ("CDMA") and/or IEEE 802.11g (and its variants) and/or WiMAX and/or combinations and variants thereof.

Network 62, in turn, is interoperable with link 70 and able to communicate thereover. Network 62 can be, for example, the Internet, the Public Switched Telephone Network ("PSTN"), an Intranet, a local area network and/or combinations thereof.

Application server 58 is any type of computing device executing a software application 68 hosted for access by client machine 54. As a simple example, application 68 can be in the form of a web site or web application on behalf of a web browser or web client executing on client machine 54. Software application 68 will be explained in greater detail below. Application server 58 connects to network 62 via link 74. Like link 70, link 74 can be wired or wireless or combinations thereof, and is complementary to the network interface in application server 58 and network 62.

Application server 58 can thus receive input from user U that is entered into client machine 54 and transmitted to application server 58 via network 62. Likewise, application server 58 is operable to process such input and generate output, via application 68, and transmit that output back to client machine 54 for presentation to user U.

Application server 58 also connects to a subscriber storage device 66 via an active profile server 78. Active profile server 78 connects to application server 58 via a link 80, while active profile server 78 connects to subscriber storage database 66 via a link 81. Again, the implementation of links 80 and 81 are not particularly limited and merely need provide connectivity between respective components. For example, storage device 66 can be implemented as a hard disk drive within active profile server 78 and thus link 81 can be the bus within server 78. By the same token active profile server 78 can be accessible to server 58 via the lightweight directory access protocol ("LDAP") and thus link 80 could be implemented in the same manner as previously described in relation to link 70. Other implementations of links 80 and 81 are contemplated.

(While in a present embodiment, only one server 58 and only one application 68 are shown, it should be understood that in other embodiments multiple applications 68 can reside on server 58, and/or multiple servers 58 can be employed.)

Storage device 66 is configured to maintain a subscriber profile database 82 that stores at least one, and typically a plurality, of profiles P-1, P-2 which are respective to subscribers S-1, S-2 within a communication network 100. (Profiles P-1 and P-2 are hereafter collectively referred to as profiles P and generically as profile P. This nomenclature is also used for subscribers S and elsewhere herein).

The configuration of communication network 100 is not particularly limited and can be based upon of any combination of known or still unconceived network infrastructure(s) and elements that permit subscribers to communicate and otherwise interact from remote locations via telecommunication devices.

Network 100 includes a first communication device 108 that connects wirelessly to a network cloud 110 via a wireless base station 112. Device 108 belongs to subscriber S-1.

Network 100 also includes a second communication device 116 that connects to a network cloud 110 via base station 120. Device 116 belongs to subscriber S-2.

Network cloud 110 provides the network infrastructure to allow base stations 112 and 120 (and, by extension, devices 108 and 116) to connect. For example, network cloud 110 and base stations 112 and 120 can be based on GSM and/or CDMA and/or combinations or variants thereof.

It is to be reiterated that the representation of network 100 is purely exemplary and is simplified in order to assist with the teachings herein. Of note, while network 100 is based on providing wireless services, network 100 can also offer wireline services.

(At this point it can now be pointed out that network 62 and network cloud 110 are drawn separately, in the present embodiment, to simplify explanation. However, while network 62 and network cloud 110 can be separate, as drawn in FIG. 1, they can actually be the same network, and thus client machine 54 can simply be another device within network 100, and user U can simply be another subscriber S within network 100.)

Storage device 66 connects to network cloud 110 and can thus be continuously updated so that profiles P within subscriber profile database 82 reflect current information about respective subscribers S within communication network 100. Table I shows exemplary contents of database 82

TABLE I

Exemplary contents of database 82

| Entry | Profile | Subscriber | Field | Contents |
|---|---|---|---|---|
| 1 | P-1 | S-1 | Subscriber Name | Bill Smith |
| 2 | P-1 | S-1 | ID of Active Device | Device 108 |
| 3 | P-1 | S-1 | Type of Active Device | Cellular Telephone |
| 4 | P-1 | S-1 | Location | Within coverage region of base station 112 |
| 5 | P-2 | S-2 | Subscriber Name | Sally Smith |
| 6 | P-2 | S-2 | ID of Active Device | Device 116 |
| 7 | P-2 | S-2 | Type of Active Device | Wireless Personal Digital Assistant |
| 8 | P-2 | S-2 | Location | Within coverage region of base station 120 |

Explaining Table I in greater detail, entries 1-4 relate to profile P-1 for subscriber S-1, whiles entries 4-8 relate to profile P-2 for subscriber S-2. Entry 1 indicates that the name of subscriber S-1 is Bill Smith. Entry 2 indicates that subscriber S-1's device 108 is active. Entry 3 indicates that the type of device being used by Bill Smith is a cellular telephone. Entry 4 indicates that subscriber S-1 is located within the coverage region of base station 112. Entry 5 indicates that the name of subscriber S-2 is Sally Smith. Entry 6 indicates that subscriber S-2's device 116 is active. Entry 7 indicates that the type of device being used by Sally Smith is a Wireless Personal Digital Assistant. Entry 7 indicates that subscriber S-2 is located within the coverage region of base station 120.

It should be understood that the contents of Table I are simplified and reflect readily available data in existing communication networks. For example, in a GSM network, entries 2 and 6 in Table I can be implemented as the International Mobile Equipment Identity ("IMEI"). Likewise, the fact that a particular subscriber is active within network 100 is often referred to as "presence" information, a fact that is implicit within entries 2 and 6 of Table I. Such presence information can be dynamically derived from the network according to standards such as Internet Engineering Task Force ("IETF") Presence, Open Mobile Alliance ("OMA") Simple Presence, or 3GPP Presence, or presence information provided by the subscriber Such presence information can include more information than whether or not a subscriber is active, but can also include whether or not the subscriber is in a call and/or other information as will be appreciated by those skilled in the art.

As will be explained in greater detail below, application 68 is configured to make use of information about subscribers S during execution.

Figure 2:
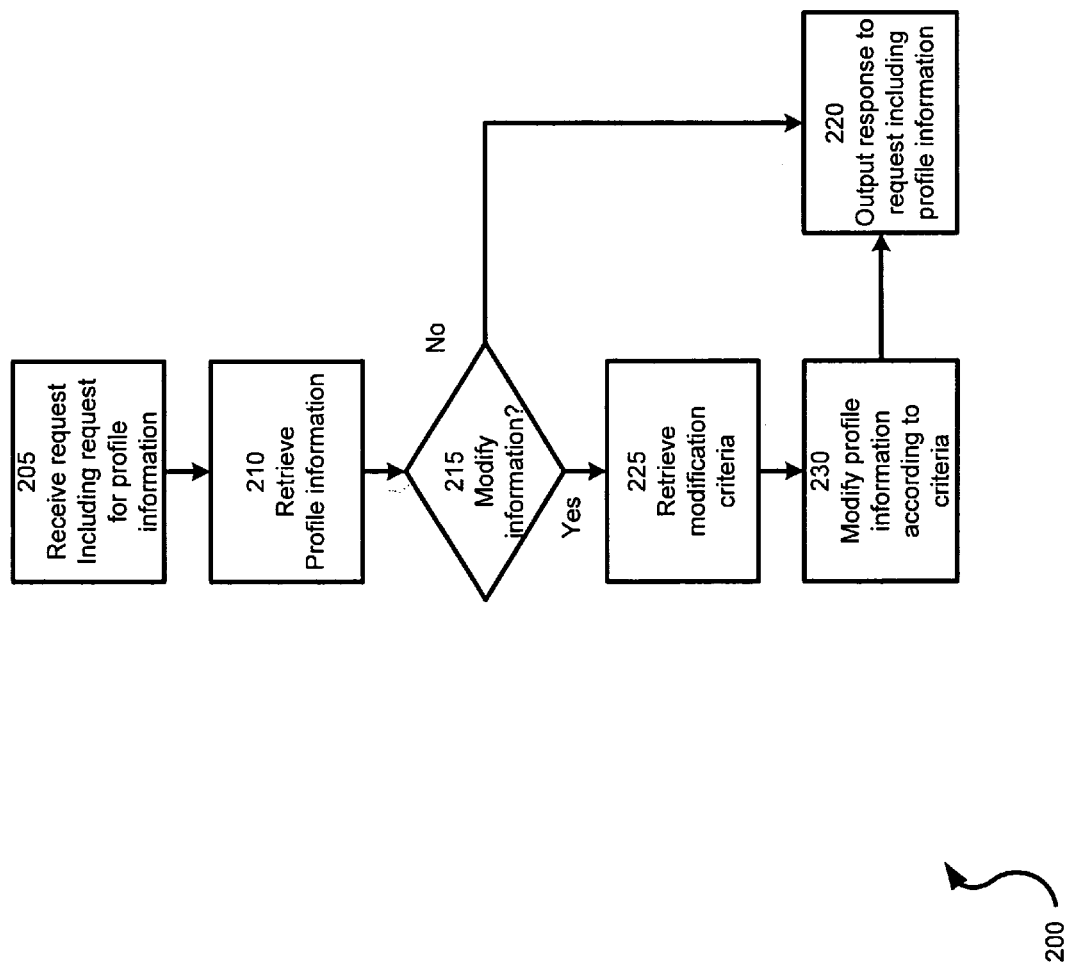
FIG. 2 shows a flowchart depicting a method for delivering profile services in accordance with an embodiment of the invention.

Referring now to FIG. 2, a method, depicted in the form of a flow chart, for providing active profile services is indicated generally at 200. To assist in explaining method 200, it will be assumed that method 200 is performed using system 50. However, it is to be understood that method 200 can be performed using other systems, other than system 50 and/or using variations of system 50. Likewise, it is to be understood that variants of method 200 can be performed using system 50.

Figure 3:
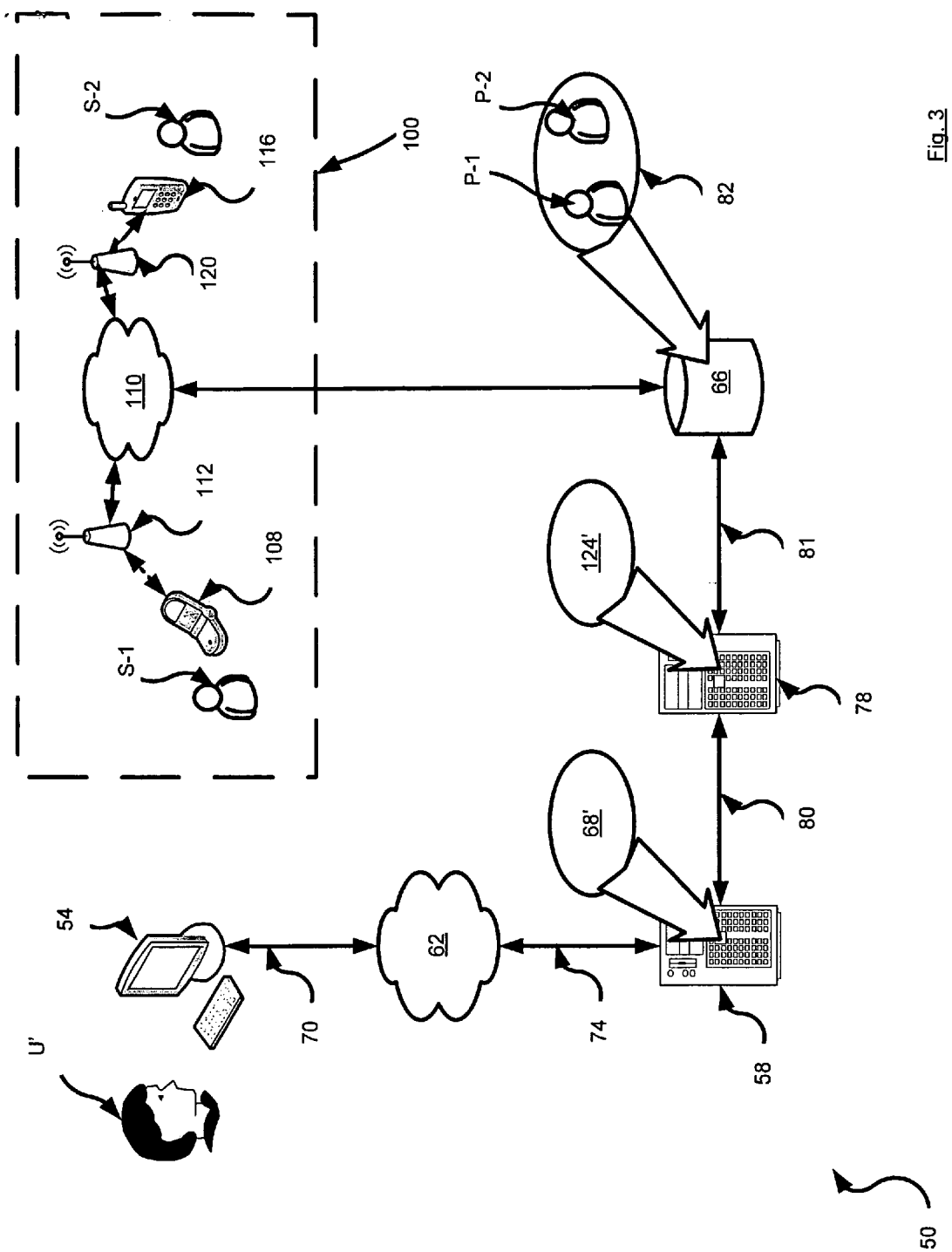
FIG. 3 shows the system of FIG. 1 making certain assumptions about the system of FIG. 1 for assisting in illustrating the performance of the method of FIG. 2.

Before explaining method 200, certain assumptions will be made to assist in the explanation of method 200. These assumptions are represented in FIG. 3. First, it will be assumed that server 58 stores application 68'. Application 68' has a simple function, which is to respond to queries from user U' as to locations of different subscribers S within network 100. It is also assumed that database 82 is stored with the contents of Table I. It is also assumed that profile server 78 contains a set of modification criteria 124'. As will be discussed further below, modification criteria 124' is used to modify, according to criteria 124', certain contents of database 82 when those contents are retrieved by server 58. Table II shows exemplary contents of modification criteria 124'.

TABLE II

Exemplary modification criteria 124'

| Entry | Subscriber | Criterion |
|---|---|---|
| 1 | S-1 | If location is requested by user U' then always report location as being within coverage region of base station 120 |
| 2 | S-1 | If location is requested by user U" then always report location actual location |

Explaining Table II in greater detail, entries 1-2 only relate to subscriber S-1. Entry 1 indicates that if a request for location of subscriber S-1 originates from user U', then the reported location of subscriber S-1 should always indicate that subscriber S-1 is within the coverage region of base station 120. Entry 2 indicates that if a request for location of subscriber S-1 originates from user U", then the reported location of subscriber S-1 should always report the actual location of subscriber S-1.

It is to be reiterated that the contents of Table II are merely exemplary. Continuing with this illustrative example, assume that subscriber S-1 has just begun a personal, "dating" relationship with user U', and wishes to permit user U' to query as to the location of subscriber S-1, but still allow subscriber S-1 to preserve some privacy and/or anonymity with regard to user U' and therefore not necessarily accurately report as to the location of subscriber S-1. On the other hand, assume that subscriber S-1 is in the employ of user U", and wishes to permit user U" to always be able to query the location of subscriber S-1. The reasons for subscriber S-1 setting criteria 124' in this example are personal to subscriber S-1 and are not particularly limited. Indeed, the flexibility of the types of criteria is one of the advantages of the present invention. In any event, it can be desired to configure server 78 so that subscriber S-1 has the ability to modify criteria 124' via a user interface (not shown).

Figure 4:
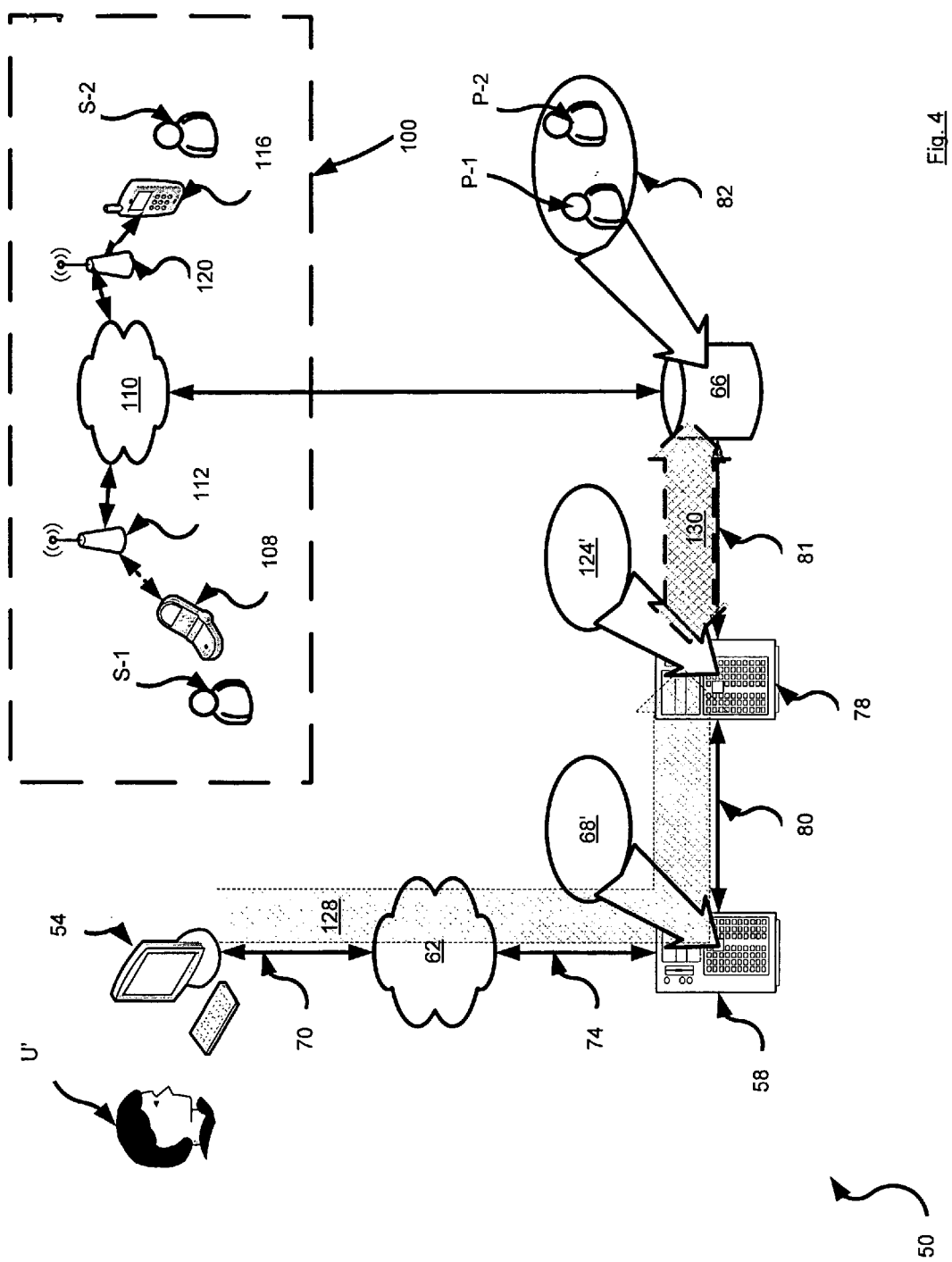
FIG. 4 shows the performance of certain steps of the method of FIG. 2 in the system shown in FIG. 3.

Proceeding now with explaining method 200, using the above assumptions, method 200 begins at step 205. At step 205 a request is received which includes a request for profile information. Such a request is represented in FIG. 4 as an arrow indicated at 128 referred to hereafter as request 128. In system 50, request 128 can be in the form of user U' using a web-browser to access application 68'. User U' can, via request 128, send data to application 68' requesting the location of subscriber S-1. Application 68', in turn, will query active profile server 78 for the location of subscriber S-1.

Figure 5:
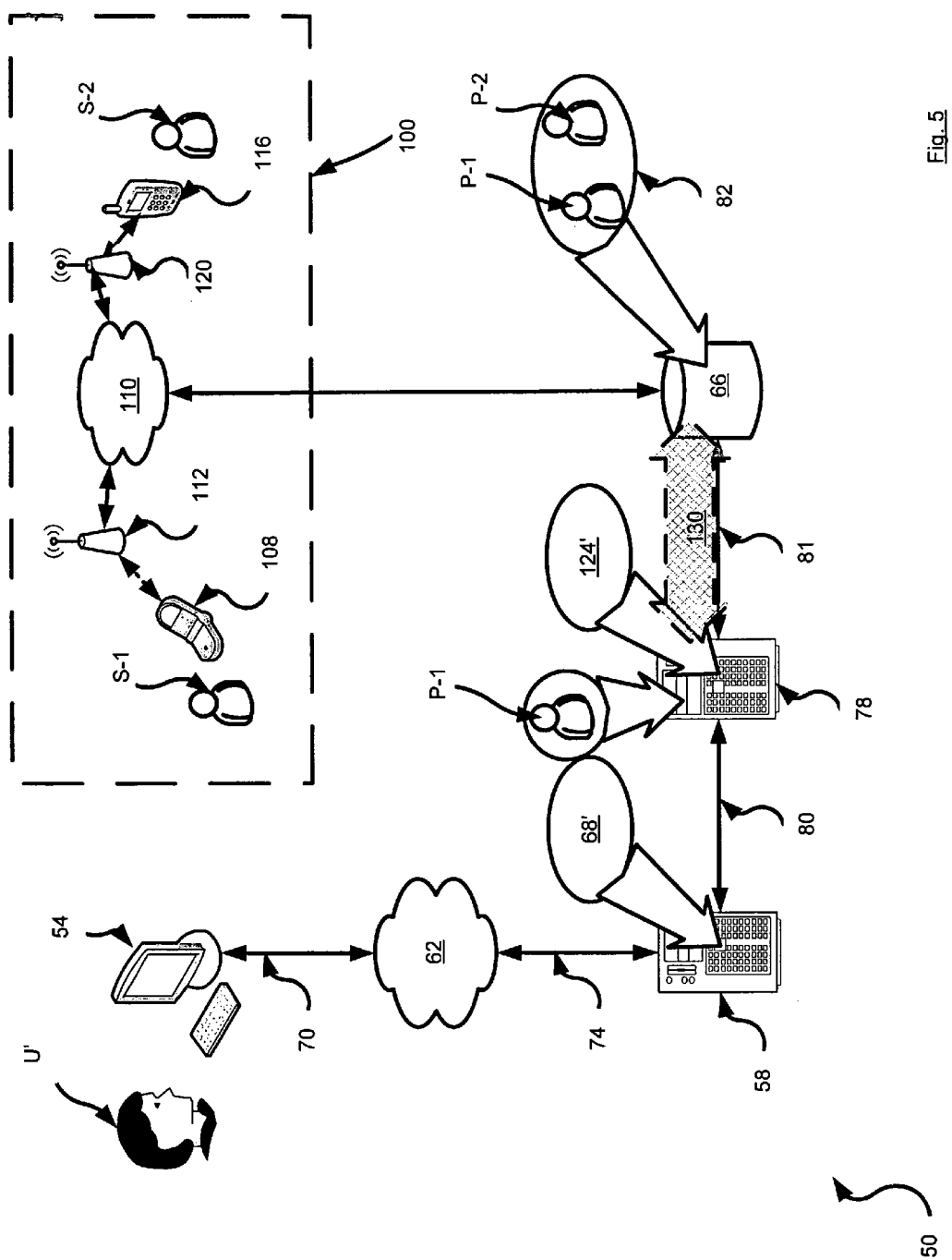
FIG. 5 shows the performance of certain steps of the method of FIG. 2 in the system shown in FIG. 3.

Next, at step 210, profile information is retrieved. Step 210 is performed by profile server 78 which queries database 82 for the relevant profile information. Such a query is represented in FIG. 5 as a double-headed arrow indicated at 130 and referred to hereafter as query 130. As a result of query 130, entries 1-4 of Table I, (i.e. the contents of profile P-1) are returned to and now locally maintained at server 78, as represented in FIG. 5.

Next, at step 215, a determination is made as to whether to modify the profile information. In system 50, and continuing with the present example, this step is performed by profile server 78, which utilize criteria 124' to modify the contents of profile P-1 if such modification is required according to criteria 124'. However, since the request for the location of subscriber S-1 came from user U', and since entry 1 of Table II includes the criteria that call for the modification of profile P-1, then at step 215 it will be determined that "yes", the profile information is to be modified, and at this point method 200 will advance from step 215 to step 225.

(If, however, it was determined at step 215 that no modification is needed, then method 215 advances to step 220. This particular branching will be discussed in greater detail below.)

At step 225, modification criteria are retrieved. Continuing with the present example, server 78 will thus retrieve the contents of criteria 124'. Next, at step 230, the profile information will be modified according to the criteria retrieved at step 225. In the context of the present example, server 78 will generate a modified profile P-1', as represented in Table III.

TABLE III

Exemplary contents of modified profile P-1'

| Entry | Subscriber | Field | Contents |
|---|---|---|---|
| 1 | S-1 | Subscriber Name | Bill Smith |
| 2 | S-1 | ID of Active Device | Device 108 |
| 3 | S-1 | Type of Active Device | Cellular Telephone |
| 4 | S-1 | Location | Within coverage region of base station 120 |

Figure 6:
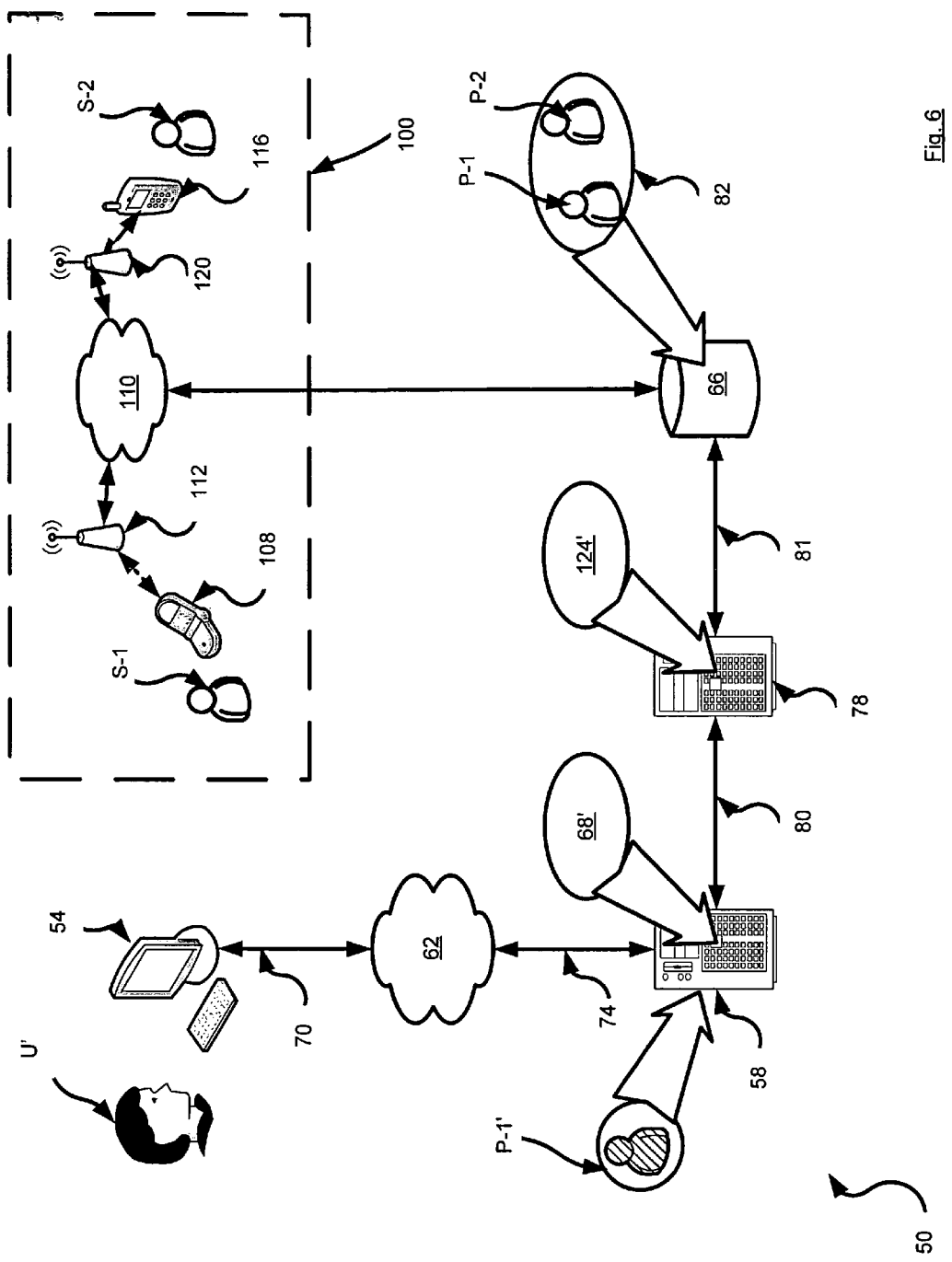
FIG. 6 shows the performance of certain steps of the method of FIG. 2 in the system shown in FIG. 3.

As a result of performing step 230, modified profile P-1' is generated by server 78 and returned to application server 58, as represented in FIG. 6.

Figure 7:
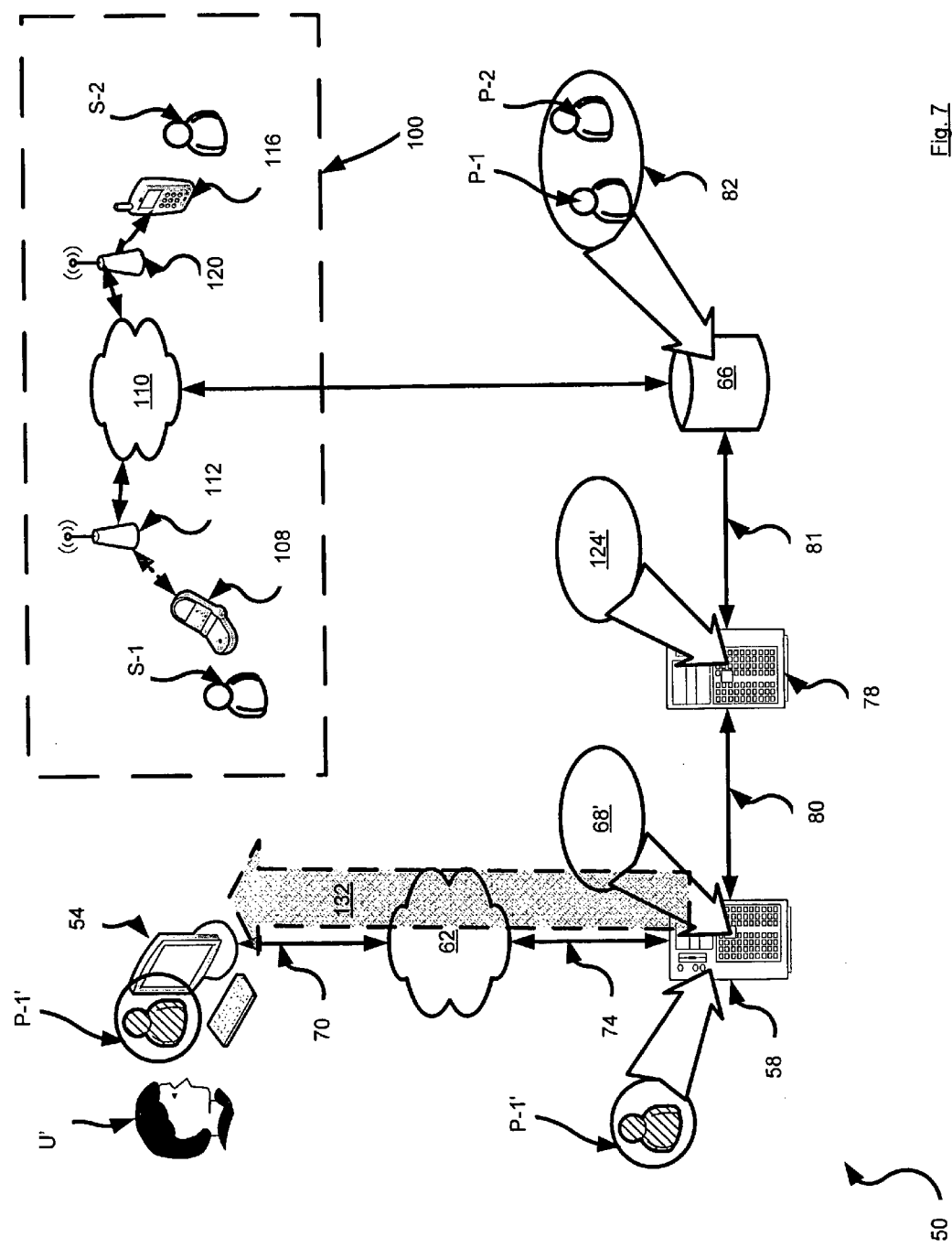
FIG. 7 shows the performance of certain steps of the method of FIG. 2 in the system shown in FIG. 3.

Next, method 200 advances from step 230 to step 220, at which point an output is generated in response to the request received at step 205, which includes the profile information from step 225. Step 230 is represented in FIG. 7, where the response to the request is represented as an arrow indicated at 132 referred to hereafter as response 132. Response 132 includes profile P-1' (or at least the location information in entry 4 of Table II), which is returned to client machine 54 and presented to user U' on the display of client machine 54. At this point user U' is presented with profile information that indicates that subscriber S-1 is within the coverage region of base station 120, when in fact subscriber S-1 is within the coverage region of base station 112.

Figure 8:
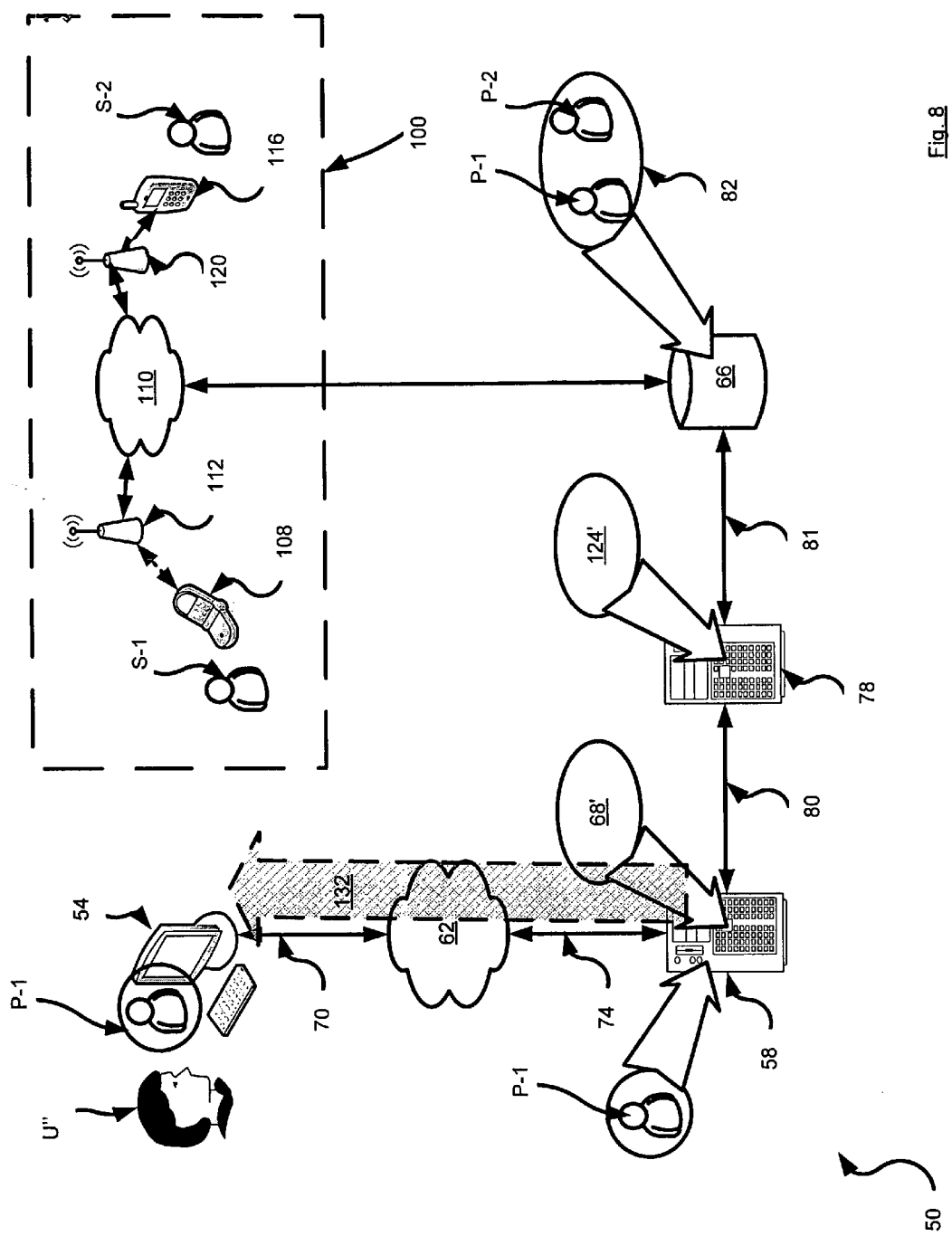
FIG. 8 shows the system of FIG. 1 making certain assumptions about the system of FIG. 1 for assisting in illustrating the performance of the method of FIG. 2; and, FIG. 9 shows an alternative configuration of the system of FIG. 1.

This concludes this exemplary discussion of the performance of method 200. Referring now, however to FIG. 8, those skilled in the art will now appreciate that if method 200 were invoked by user U" using system 50, then at step 215 a determination would be made, using the contents of Table II, that "No", modification of profile information is not needed. Thus, as a result of performing method 200 in this example, user U" would be presented with the true contents of profile P-1 (or at least the location information in Entry 4 of Table I), and thus user U" would be shown the correct whereabouts of subscriber S-1, as being within the coverage region of base station 112.

It should now be understood that many variations, enhancements and modifications and combinations of system 50 and/or method 200 are contemplated. In the example above, application 68' was an application used for informing a user U as to a location of a subscriber S within network 100; the location results delivered to the user U by that application 68' could be a modification of the actual location of the subscriber S based on criteria 124'. However, system 50 can be applied to a broad range of different types of applications, in addition to or in lieu of application 68'.

For example, application 68 could be an instant messaging program that allows user U to communicate with a subscriber S. Modification criteria 124 could be different name aliases that a subscriber S wishes to use for different users. Table IV shows exemplary modification criteria where application 68 is an instant message program.

TABLE IV

Exemplary modification criteria 124

| Entry | Subscriber | Criterion |
|---|---|---|
| 1 | S-1 | If chatting with User U', then identify Subscriber Name as "Fred Jones" |
| 2 | S-1 | If chatting with User U", then identify Subscriber Name as "Frank Fitch" |

Figure 9:
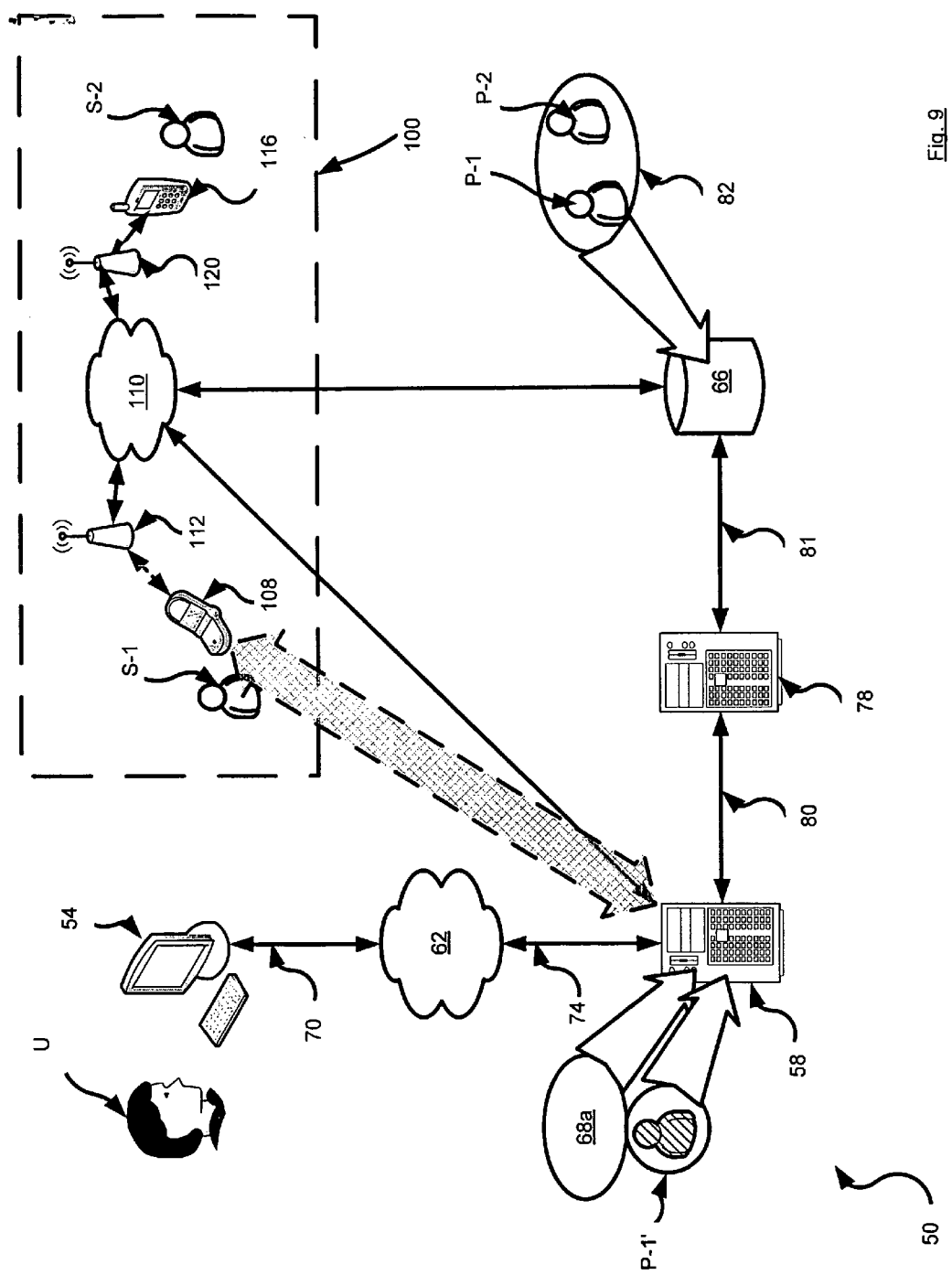

FIG. 9 shows a still further example of an application 68a, whereby a connection exists in system 50 between network cloud 110 and server 58. Application 68a is configured to perform method 200 on behalf of subscriber S-1, in the same manner that application 68' was configured to perform method 200 on behalf of user U. For example, application 68a could be a web application which automatically delivers subscriber content based on the location of subscriber S—for example, news stories about current events occurring within the location of subscriber S. Application 68a could thus be "spoofed" into believing that subscriber S-1 was always located within the region of coverage of base station 120, so that subscriber S-1 would always receive new stories about current events occurring within the region of coverage of base station 120, even though at the time subscriber S-1 accesses application 68a, subscriber S-1 is in fact located within the region of coverage of base station 112.

As discussed, those skilled in the art will now appreciate that many variants of system 50 contemplated. For example, the functionality of server 58, server 78 and storage device 66 can be incorporated into a single computing device, or they can be distributed across several computing devices. Likewise, server 78 can be configured to service a plurality of different application servers like application server 58, in which case server 78 could be configured to communicate with application servers via the Liberty Enhanced Client Profile (LECP) promulgated by the Liberty Alliance Project. (See http://www.projectliberty.org). As another example, multiple active profile servers, like server 78 can be implemented within a single network, with different servers 78 managing different subscribers.

It should now also be appreciated that the contents of each profile P can include any type of information about a given subscriber S, including a) demographic information such as name, address, age, race, gender, income, education; b) group membership information such as employers, institutions, citizenship, telecommunication service provider; c) network element information such as presence, location, context (e.g. is the subscriber "in-a-call"); d) device management information such as a wireless access protocol ("WAP") gateway, the type of device being used by the subscriber. All such information can be included, and, modified, if appropriate during performance of method 200 before presentment to a particular application. Table V provides an alternative, extended set of exemplary contents for profile P-2 for database 82.

TABLE V

Exemplary Extended contents of database 82

| Entry | Profile | Subscriber | Field | Contents |
|---|---|---|---|---|
| 1 | P-2 | S-2 | Subscriber Name | Sally Smith |
| 2 | P-2 | S-2 | ID of Active Device | Device 116 |
| 3 | P-2 | S-2 | Type of Active Device | Wireless Personal Digital Assistant |
| 4 | P-2 | S-2 | Location | Within coverage region of base station 120 |
| 5 | P-2 | S-2 | Default Language | English |
| 6 | P-2 | S-2 | Modification Criteria Exists? | Yes |
| 7 | P-2 | S-2 | Location of Modification Criteria Database | Profile Server 78 |
| 8 | P-2 | S-2 | Subscribed Applications and Rates | i) VoIP__Talk__is__Cheap ($0.05 per minute); ii) Friend__Finder ($0.50 per use); iii) Entertainment__Daily__News ($2.00 per broadcast) |
| 9 | P-2 | S-2 | Account Type | Pre-paid |
| 10 | P-2 | S-2 | Account Location | Profile Server 78 |
| 11 | P-2 | S-2 | Age | 22 |
| 12 | P-2 | S-2 | Group Membership 1 | University of Redknee |
| 13 | P-2 | S-2 | Group Membership 2 | Cafeteria Services, University Redknee |
| 14 | P-2 | S-2 | Service Provider | Clever Mobile |

Explaining Table V in greater detail, entries 1-4 relate to profile P-2 for subscriber S-2, and are the same as entries 5-8 in Table I. Entries 5-14 are examples of additional entries which can be included in a profile P.

Entry 5 indicates that the default language for the subscriber is English. Entry 6 indicates that the subscriber S-2 does have modification criteria that can be used to modify profile P-2. Entry 7 indicates the location of the server where the modification criteria referenced in Entry 6 exists. Entry 7 is particularly helpful if there are multiple active profile servers within a given network, or if the modification criteria is stored on a different machine (i.e. location) than server 78 or database 82. (Of course, entries 6 and 7 are not necessary if the modification criteria is included, in its entirety, in Table V. Indeed, it should now also be understood that modification criteria 124 can in fact be included directly within the specific profile P for a particular subscriber S, rather than being managed separately. In this situation, the modification criteria can become part of the actual profile. Indeed, it is contemplated that aspects of the present invention may be particularly useful for allowing a subscriber S to manage privacy settings associated with the ability of third-parties to access a profile P for that particular subscriber S. Thus, privacy settings can in and of themselves be an aspect of a particular profile P.)

Entry 8 indicates any applications to which subscriber S-2 actually subscribes and the rates for those applications. Three examples are given under "Contents" of Entry 8. Those examples include the applications are i) VoIP_Talk_is_Cheap, a hypothetical Voice over Internet Protocol telephony application which costs $0.05 per minute for subscriber S-2 to use; ii) Friend_Finder, is a hypothetical application that can be used to locate the subscriber or other subscribers using presence information associated with a given subscriber, which costs subscriber S-2 $0.50 each time subscriber S-2 uses the application; iii) Entertainment_Daily_News, a hypothetical news service that "pushes" newcasts in a video streaming format about celebrities in the entertainment industry, which costs subscriber S-2 $2.00 for each broadcast. Entry 9, Account type, indicates that subscriber S-2 is a prepaid subscriber, as opposed to a post-paid subscriber. Entry 10, account location indicates the subscriber's account is maintained on profile server 78—however, entry 10 could indicate any address, such as an internet protocol (IP) address indicating a server where subscriber S-2's account is maintained. Entry 11, Age, indicates that the age of the subscriber is twenty-two. Entry 12, Group Membership 1, indicates that subscriber S-2 is a member of an academic institution known as the Redknee University, perhaps in the capacity as faculty, staff or student. Entry 13, Group Membership 2, indicates that subscriber S-2 is an employee of the Cafeteria Services at Redknee University. Entry 14, Service Provider, indicates that the carrier responsible for providing service to subscriber S2 is named "Clever Mobile". It is to be reemphasized that the contents of Table V are exemplary and not exhaustive.

It is also to be reemphasized that the types of modification criteria discussed above are examples are also non-exhaustive. For example, modification criteria could be based on reciprocity. Assume that subscriber S-2 uses method 200 to request the profile P-1 of subscriber S-1. In this case, the decision at step 215 of whether or not to modify profile P-1 (or event to release profile P-1 at all) could be based upon modification criteria associated with subscriber S-1 querying profile P-2 to determine whether subscriber S-2 will permit subscriber S-1 to access profile P-2. The reciprocity could be based on the same or different aspects of the other's profile being made available to the other. For example, "I (subscriber S-2) will provide my presence to you (subscriber S-1) if you (subscriber S-1) provide your location to me (subscriber S-2)."

As another example of different modification criteria, subscriber S-1 could be provided with a rule based on the following: "If subscriber S-2 requests my location, and my presence information indicates that I am 'busy' then provide subscriber S-2 with a location that is different from my actual location. Otherwise provide my actual location."

As another example, subscriber S-2's modification criteria could be made contingent on the current profile of one or more other subscribers. For example, subscriber S-2's modification criteria could be based on the profile of subscriber S-1: "If user U requests the location of subscriber S-2, then the location of subscriber S-2 will only be provided to user U if subscriber S-2 is within coverage as the same base station as subscriber S-1. Otherwise refuse to provide location of subscriber S-2".

It is also to be reemphasized that the types of applications discussed above are examples are also non-exhaustive. Application 68 could be configured to request multiple fields from each profile, and the profile server 78 also indexes another server (not shown). As an example of an additional application, application 68 could be the Entertainment_Daily_News application example given above in Table V, which includes a video streaming of a newscast of entertainment news. The Entertainment_Daily_News could be configured to request multiple fields for each profile P, including location, device type, subscribed rate for service from the subscriber profile P via a single query for the purpose of (i) determining if there is any preferred localized content; (ii) ensuring that the content can be compiled and altered to meet the display, bandwidth and processing capabilities of the subscriber's device; and (iii) whether the subscriber can pay for the service (i.e. does the subscriber have sufficient funds in their pre-paid account to receive the service.)

As a still further variation, while the embodiments hereabove relate to modifying profile information P, in other embodiments content that is delivered by application 68 could be modified based on profile P or modified profile P'. For example, assume that application 68 is an instant messaging application that presented an icon or picture that represented the mood of each subscriber. Depending on the modification criteria, the icon could be presented in different colours (or the like) to indicate the mood of the subscriber—e.g. red for angry, and blue for calm. The mood of the subscriber could be configured by the subscriber to appear different depending on which user, U or U", that the subscriber was communicating with.

As a still further variation, each profile P could also be augmented or modified in turn by application 68 based on subscriber inputs provided to application 68. For example, if application 68 was a web-browser, then the contents of profile P could be appended, or modified, according to the sites that were browsed, or browser preferences. In turn, such a profile P could be modified using method 200.

It can also be reemphasized at this point that the teachings herein can be useful for a variety of contexts, but one particularly advantageous context is privacy rights of a particular subscriber S. In this context, step 215 of method 200 can include a determination as to whether to respond to the request for profile information at all. Put in other words, the "modification" of the profile information could simply be a decision to refuse to provide any profile information about a given subscriber. Application 68, modification criteria 124 and profiles P can all be tailored to comply with privacy settings that are configured by a given subscriber, and/or can be tailored to comply with mandatory privacy laws. For example, assume that base station 112 is located in a first country, and base station 120 is located in a second country. Now also assume that the first country has privacy legislation that forbids disclosing locations of subscribers S, but the second country has no such legislation. Also assume that this legislation is incorporated into modification criteria 124. Now also assume that neither subscriber S has set any modification criteria. In this case, when user U makes a request for the location of subscriber S-1, the user will receive a "null" response, refusing to answer the query, in compliance with the local privacy legislation. Conversely, user U makes a request for the location of subscriber S-2, the user will receive a response indicating the location of subscriber S-2. Combinations of this variation, and other variations, are contemplated.

The present invention provides a novel system and method for active profile services. While the foregoing presents certain embodiments of the present invention, it is to be understood these embodiments are exemplary and non-limiting, and the scope of the invention is defined by the claims attached hereto.

The invention claimed is:

1. An active profile server comprising:
   a processing unit;
   an interface connecting said processing unit to a profile database; said profile database storing profile information respective to at least one subscriber;
   an interface connecting said processing unit to an application requesting access to said profile information; and,
   a memory for storing at least one modification criterion in association with an identifier of said subscriber, said modification criterion including substitution data and a condition defining when to use said substitution data;
   said processing unit configured to retrieve said profile information from said profile database and to automatically generate and present, without modifying said profile database, a modified version of said profile information to said application in place of said profile information, at least a portion of said modified version including said substitution data in place of information originally contained within said profile information.

2. The active profile server of claim 1 wherein said modified version includes a message that said request to access said profile information is refused.

3. The active profile server of claim 1 wherein said profile database is stored locally on said profile server.

4. The active profile server of claim 1 wherein said profile database is stored at a location remote from said profile server.

5. The active profile server of claim 1 wherein said profile database includes one or more of the following fields of information for each subscriber: subscriber name; ID of Active Device; Type of Active Device; Location; Default Language; Modification Criteria Exists?; Location of Modification Criteria Database; Subscribed Applications and Rates; Account Type; Account Location; Age; Gender; Address; Group Membership Information; and Service Provider.

6. The active profile server of claim 1 wherein said profile information includes presence information.

7. The active profile server of claim 1 wherein said application is configured to modify or append to said profile information.

8. The active profile server of claim 1 wherein said at least one subscriber modification criterion is included in said profile information.

9. The active profile server of claim 1 wherein said at least one subscriber modification criterion implements privacy legislation.

10. A method for providing active profile services comprising:
    storing, in a memory of a profile server, at least one modification criterion in association with an identifier of a subscriber, said modification criterion including substitution data and a condition defining when to use said substitution data;
    receiving, at an interface of said profile server, a request to access profile information of said subscriber, said profile information stored in a profile database;
    retrieving said profile information;
    automatically generating a modified version of said retrieved profile information at a processing unit of said profile server, without modifying said profile database, according to said at least one subscriber modification criterion by substituting at least a portion of said profile information with said substitution data; and
    presenting said modified profile information in response to said request.

11. The method of claim 10 further comprising responding to said request by presenting said profile information in unmodified form if so permitted by said modification criteria.

12. The method of claim 10 wherein said modified version includes a message that said request to access said profile information is refused.

13. The method of claim 10 wherein said profile information includes one or more of the following fields of information for each subscriber: subscriber name; ID of Active Device; Type of Active Device; Location; Default Language; Modification Criteria Exists?; Location of Modification Criteria Database; Subscribed Applications and Rates; Account Type; Account Location; Age; Gender; Address; Group Membership Information; and Service Provider.

14. The method of claim 10 wherein said profile information includes presence information.

15. The method of claim 10 further comprising the step of appending additional information to said profile information.

16. The method of claim 10 wherein said at least one subscriber modification criterion is included in said profile information.

17. The method of claim 10 wherein said at least one subscriber modification criterion implements privacy legislation.

18. A non-transitory computer readable medium comprising a plurality of programming instructions for execution on a server; said programming instructions implementing a method for providing active profile services comprising:
    storing, in a memory of a profile server, at least one modification criterion in association with an identifier of a subscriber, said modification criterion including substitution data and a condition defining when to use said substitution data;
    receiving, at an interface of said profile server, a request to access profile information of said subscriber, said profile information stored in a profile database;
    retrieving said profile information;
    automatically generating a modified version of said retrieved profile information at a processing unit of said profile server, without modifying said profile database, according to said at least one subscriber modification criterion by substituting at least a portion of said profile information with said substitution data; and,
    presenting said modified profile information in response to said request.

* * * * *